United States Patent [19]

Callahan et al.

[11] Patent Number: 5,407,338
[45] Date of Patent: Apr. 18, 1995

[54] MANUAL RESIN EXTRUDER FOR EFFECTING GLASS REPAIR

[76] Inventors: Michael J. Callahan, 733 Lake St., Ste. 313; James A. Fikse, 300 7th Ave. South, No. 15, both of Kirkland, Wash. 98033

[21] Appl. No.: 926,889
[22] Filed: Aug. 7, 1992
[51] Int. Cl.⁶ .............................. B32B 35/00
[52] U.S. Cl. .......................... 425/12; 264/36; 264/40.3; 425/13; 425/170
[58] Field of Search ............... 425/11, 12, 13, 170; 264/36, 40.3; 156/94

[56] References Cited

U.S. PATENT DOCUMENTS

| | | | |
|---|---|---|---|
| 3,988,400 | 10/1976 | Luhman, III | 425/12 |
| 3,993,520 | 11/1976 | Werner et al. | 425/13 |
| 4,033,484 | 7/1977 | Ornsteen | 222/146.5 |
| 4,047,863 | 9/1977 | McCluskey et al. | 425/13 |
| 4,200,478 | 4/1980 | Jacino et al. | 425/11 |
| 4,249,869 | 2/1981 | Petersen | 425/13 |
| 4,385,879 | 5/1983 | Wilkinson | 425/13 |
| 4,569,808 | 2/1986 | Smali | 425/13 |
| 4,597,727 | 7/1986 | Birkhauser, III | 425/13 |
| 4,622,085 | 11/1986 | Yamada et al. | 425/13 |
| 4,775,305 | 10/1988 | Alexander et al. | 425/13 |
| 4,776,780 | 10/1988 | Banks | 425/13 |
| 4,814,185 | 3/1989 | Jones | 425/13 |
| 4,820,148 | 4/1989 | Anderson | 425/13 |
| 4,975,037 | 12/1990 | Freiheit | 425/13 |
| 4,986,862 | 1/1991 | Matsufuru | 425/13 |
| 5,026,187 | 6/1991 | Belanger et al. | 222/146.2 |
| 5,048,722 | 9/1991 | Lichu | 222/146.2 |
| 5,116,441 | 5/1992 | Campfield, Jr. | 425/13 |
| 5,122,042 | 6/1992 | Einiger | 425/13 |
| 5,186,949 | 2/1993 | Lai | 425/13 |

Primary Examiner—Jay H. Woo
Assistant Examiner—Joseph Leyson
Attorney, Agent, or Firm—Robert W. Beach

[57] ABSTRACT

A resin extruder for supplying resin to flaws in laminated glass includes a casing forming a resin reservoir from which resin is dispensed through a nozzle by screwing inward a ram partially received in the casing and carrying a pressure gauge communicating with the reservoir.

2 Claims, 2 Drawing Sheets

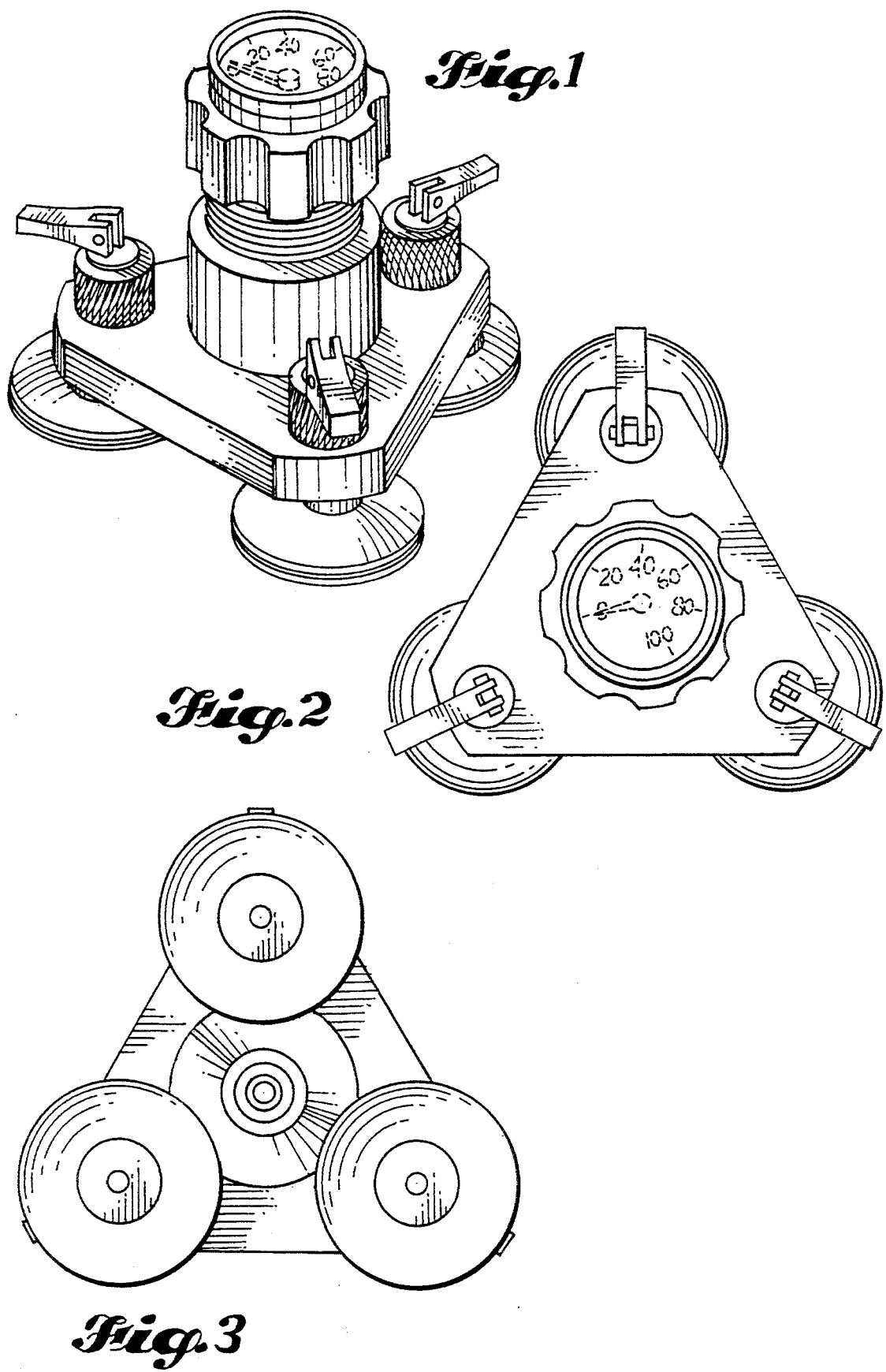

MANUAL RESIN EXTRUDER FOR EFFECTING GLASS REPAIR

BACKGROUND OF THE INVENTION

1. Field of the Invention

This invention relates to a manual resin extruder for extruding resin to fill flaws in laminated glass.

2. The Problem

Modern automobile windshields are made of laminated glass. Flaws are produced in such windshields by being impacted by stones or other debris, which flaws may take various forms. Usually the flaw occurs only in the outer surface layer of the laminated glass. Such flaw may be simply a bruise causing localized delamination of the outer layer of the glass from the inner layer or layers without any discernible nick or pit. Such impact, on the other hand, may produce a nick or pit which usually is quite small. Because usually all the stresses inherent in a windshield resulting from its manufacture have not been dissipated, an impact may also produce one or more cracks or checks originating at the point of impact. Such cracks or checks may radiate outward from the point of impact. Because of unrelieved stress inherent in a laminated glass sheet, one or more of such cracks or checks may propagate spontaneously at an indeterminate time after the impact if no action is taken to prevent such occurrence.

It is known that spontaneous propagation of cracks from a point of impact on a laminated glass windshield can be prevented by utilizing resin to rebond the surface lamination of the laminated glass to the lamination behind it if such precaution is taken promptly. Resin can be used for the dual purpose of rebonding the surface lamination of the laminated glass to its backing and filling any chip, nick or pit which may have been produced in the outer surface of the surface lamination.

3. Prior Art

Various types of extruders or dispensers have been used for supplying resin to fill flaws in laminated glass, but in general they have been awkward and time-consuming to use and have not been very reliable in effecting consistently satisfactory results.

SUMMARY OF THE INVENTION

A principal object of the present invention is to provide a resin extruder which can be applied to a sheet of laminated glass, particularly a convex sheet such as an automobile windshield, quickly and accurately for effecting a resin injection, yet which will not impose detrimental loads on the laminated glass sheet.

Another object is to provide a resin injector which can be mounted on a convexly curved sheet of laminated glass in a stable fashion irrespective of the nature or sharpness of curvature of the laminated glass.

A further object is to provide a resin extruder which is effective in supplying resin to flaws in laminated glass and which is consistently reliable in the results produced.

It is also an object to provide a resin extruder that can not only be mounted quickly and easily on a convexly curved sheet of laminated glass but which can be operated quickly and easily to dispense the desired amount of resin at the desired location.

An additional object is to provide a resin extruder that is compact but which provides resin capacity for effecting multiple resin ejections without requiring refilling of the extruder.

The foregoing objects can be accomplished by utilizing a resin extruder having a large reservoir from which resin can be extruded manually by rotation of a screw-mounted ram relative to a reservoir that is carried by a tripod mounted base having suction cups that can be set on a curved laminated glass sheet.

BRIEF DESCRIPTION OF THE DRAWINGS

FIG. 1 is a top perspective of the tripod resin extruder of the present invention.

FIG. 2 is a top plan, and FIG. 3 is a bottom plan of the extruder.

DETAILED DESCRIPTION

Figure 4:
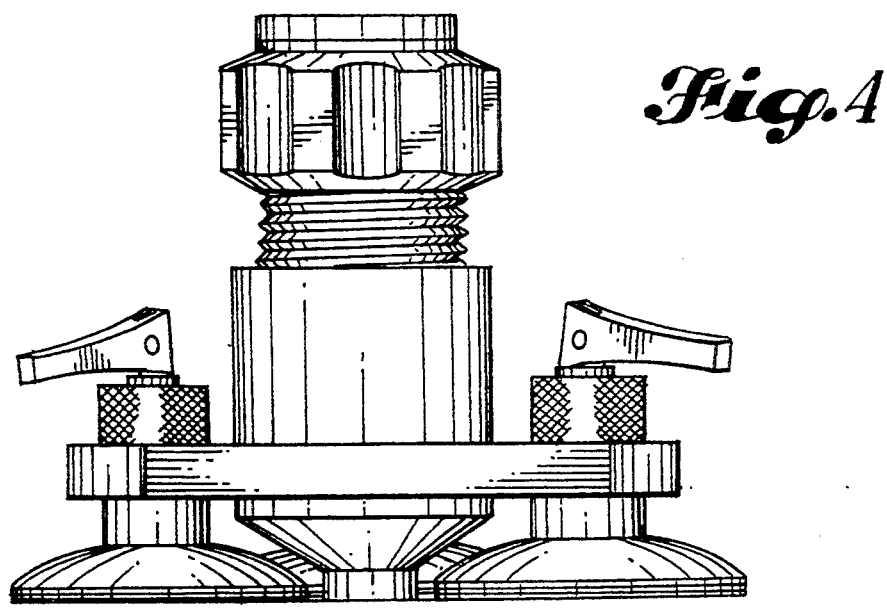
FIG. 4 is a side elevation of the extruder.
Figure 5:
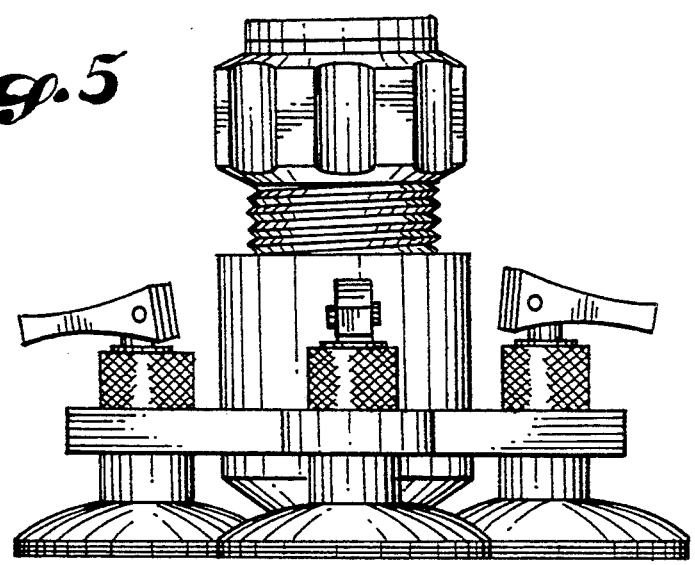
FIG. 5 is a central longitudinal section through the extruder taken along line 5—5 of FIG. 2.

The resin ejector or extruder of the present invention includes a base 1 generally of plate form which preferably is substantially an equilateral triangle having truncated apexes. Such base carries a casing 2 located centrally of the base and preferably formed integrally with the base as shown in FIG. 5. The casing has an extruder nozzle 3 through the center of its lower end for positioning against the surface of the laminated glass windshield W at the location to which it is desired to supply resin. The escape of resin laterally from between the casing end and the windshield surface can be prevented by an O-ring seal 4 encircling the extruder nozzle 3 which will be pressed tightly against the outer surface of the windshield.

The base 1 is supported by a tripod arrangement including three suction cups 5 mounted respectively on the truncated apex portions of the base 1 as shown in FIGS. 1 and 2 so as to be arranged symmetrically around the nozzle. The suction cups are mounted on stems 6 which have reduced shanks the end portions 7 of which are threaded externally and are of a size to pass through apertures 8 in the truncated apexes of the base 1. The stems of the suction cups can be retained in the apertures of the base by nuts 9 screwed onto the threaded shanks of the stems to draw the shoulder of each stem against the underside of the base 1.

The mounting stem 6 for each suction cup 5 is hollow, providing a bore through which a rod 10 extends. The lower end of this rod adjacent to the suction cup carries a disk 11 connected to the diaphragm of the suction cup, and the upper end of the rod 10 projects above the upper end of the shank of stem 6.

Each suction cup 5 can be set against the outer surface of the windshield W by increasing the size of the cavity within the suction cup when the margin of such suction cup is sealed against the outer surface of the windshield. Such increase in volume of the cavity can be effected by raising rod 10 and its disk 11 relative to the suction cup shank 6 and the suction cup. Such raising of rod 10 can be effected by swinging a toggle lever 12 relative to the rod 10 from the broken line position shown in FIG. 5 to the solid line position. Such toggle lever is connected by pivot 13 to the upper end of rod 10. The flat pivoted end of the toggle lever bears on a washer 14 that in turn bears on the upper end of the shank of suction cup stem 6.

The extruder casing 2 has a cylindrical section 15 projecting upward above the base 1, and a section 16 projecting downward from the base which is of frustoconical shape. The interiors of casing sections 15 and 16 form a large volume resin reservoir 17 from which resin can be extruded or expressed through the nozzle 3 by a ram 18, the lower portion of which is received in the open upper end of the casing 2 and cooperates with the casing to form a hydrostatic press.

In order to be able to force the ram 18 into the reservoir cavity 17 of the casing 2, the ram has external threads 19 engageable with internal threads 20 on the inner periphery of the upper casing section 15. The ram can be rotated manually relative to the casing 2 by providing a fluted grip 21 composed of alternate axial flutes and ribs arranged around the enlarged upper end of the ram.

When resin-dispensing pressure is exerted on the resin in the reservoir 17 by rotation of the ram 18 relative to the casing 2, escape of resin upward around the ram from the reservoir 17 will be prevented by a double-ridged gasket 22 encircling the lower end of the ram and engageable with the unthreaded portion of the casing inner periphery below the internal threads 20.

Because the lower end 16 of the casing 2 is of frustoconical shape, it is preferred that the lower end 23 of the ram 18 be made of matching frustoconical shape complemental to the frustoconical shape of the inner wall 24 of the lower section of the casing. By making such surfaces complemental, maximum reduction in size of the reservoir 17 can be achieved by screwing the ram 18 downward until its lower end 23 is almost in abutment with the inner surface 24 of the frustoconical lower end of the casing.

To prevent resin from escaping from the reservoir 17 through the dispensing nozzle 3 when no pressure is being exerted by the ram 18 on the resin in the reservoir 17, the spring-closed valve 25 normally closes the passage through the nozzle 3. The elongated valve body of valve 25 projects lengthwise into the reservoir 17 from the nozzle 3 and the central bore 26 of the ram 18 is of sufficiently large cross section to receive the valve body loosely. A threaded stem 27 on the lower end of the check valve body mounts it in an internally threaded portion of the nozzle 3. As the ram 18 is screwed inward to exert pressure on the resin in the reservoir 17 the ram bore 26 moves telescopically over the elongated body of valve 25 to shorten the combined length of the elongated valve body and the ram 18. By such inward movement of the ram resin will be forced upward between the lower end of the ram and the valve body of valve 25 into the bore 26 which ordinarily will be partially filled with resin as the ram 18 is inserted into the upper portion of the casing 2 and the threads 19 of the ram are engaged with the threads 20 of the casing.

As shown in FIGS. 1, 2, 4 and 5, the enlarged outer end portion of the ram 18 exteriorly of the reservoir 17 forms an axiallyextending, generally cylindrical flange and an outwardlyopening cavity 29 encircled by such flange. The fluted grip 21 is provided on the outer circumference of the flange.

A pressure gauge 28 is carried by ram 18 at least partially received in the cavity 29 in the upper end of the ram 18 in nesting relationship and is mounted in such cavity by screwing the stem 30 of the pressure gauge into the internally threaded upper end of the bore 26 of the ram. As shown in FIG. 5, the axial passage 26 through the ram affords communication between the stem 30 of the pressure gauge 28 and the reservoir 17. When the bore 26 of the ram becomes filled with resin and rotation of the ram is continued, the amount of pressure exerted on the resin will be indicated by the pressure gauge 28.

In utilizing the extruder, each flaw should be diagnosed separately to determine the most effective treatment for that particular flaw. In some cases, any passage through the surface lamination may be almost imperceptible, in which case, and probably in most cases, it will be desirable to drill a small hole through the outer lamination of the laminated glass at the location where it is desired to inject resin. Such a drilled hole will establish the location at which the extruder is to be placed for extruding resin.

The nozzle 3 of the extruder is then spotted over such drilled hole and pressed against the windshield W in that position while the toggle levers 12 of the suction cups 5 are moved from the broken line positions to the solid line positions indicated in FIG. 5 to set the suction cups firmly in anchoring relationship to the windshield W. Because the extruder is mounted on a tripod, the suction cups will adapt themselves accurately to the outer surface of the windshield irrespective of its type and degree of curvature so that the extruder will be held reliably in the desired position without tilting or wobbling.

When the suction cups 3 have been anchored, the ram 18 is manually screwed down so that its lower end 23 will force resin past the valve body of spring-closed valve 25 into the central bore 26 of the ram until it is filled. Additional rotation of the ram will force resin past the spring-closed valve 25 and out through the nozzle 3 into the hole drilled in the windshield W and through it between the separated laminations of the laminated glass. It is desirable to force such resin under pressure into the flaw so that the resin will penetrate for a greater or lesser distance into a separation between the inner surface of the surface lamination and the remainder of the laminated glass behind it. The amount of pressure exerted on the resin will be indicated by the pressure gauge 28. To produce such pressure it is not necessary to utilize any electric or fluid pressure mechanism but the ram 18 is simply screwed into the casing 2 as much as necessary to produce the desired degree of pressure manually. Moreover, such static pressure may be maintained as long as desired in accordance with the experience of the operator.

Prior to or after initial extrusion of resin into the flaw, the ram is turned to unscrew it to some extent from the casing. Because the casing 2 is sealed by the double-ribbed gasket 22, such unscrewing of the ram 18 will produce a negative pressure in the reservoir 17 which is applied to the valve 25 and effects application of suction to the work through the nozzle 3 to suck out any air that may be confined in a pocket of the flaw between the laminations of the laminated glass at the location for resin injection. The ram is then screwed into the casing to force resin into the flaw.

When the operation of supplying resin to the flaw has been completed, the ram 18 can again be turned oppositely to retract it until the pressure gauge 18 registers zero pressure. The toggle levers 12 of the suction cups 5 can then be swung from the solid line position shown in FIG. 5 to the broken line position to release the suction cups so that the extruder can be removed from the windshield.

If there has been a pit or nick in the windshield that has been filled with resin by the above-described procedure, it may be desirable to smooth the flaw to provide a surface on the cavity flush with the outer surface of the surface lamination. The resin can then be cured to a set condition by exposing it to ultraviolet light.

If there are several flaws in the windshield, the extruder can be moved from one location to another and the operation described above repeated.

We claim:

1. In a resin extruder for supplying resin to a flaw in a surface of laminated glass including a casing, means for anchoring the casing to the surface of laminated glass, a resin reservoir of cylindrical cross section formed by the casing, a dispensing nozzle extending from one end of the reservoir for dispensing resin therefrom, the inner surface of the other end of the reservoir having an internal thread, and a ram having an inner end portion insertable into such other end of the reservoir and having an external thread engageable with the internal thread of the reservoir for effecting inward movement of the ram relative to the reservoir by rotation of the ram relative to the reservoir for exerting pressure on resin in the reservoir to extrude resin therefrom through the dispensing nozzle, the improvement comprising the dispensing nozzle having a passage therethrough much shorter than the axial extent of the reservoir and having a cross section much smaller than the cross section of the reservoir, the ram having an enlarged outer end portion exteriorly of the reservoir forming an axially extending generally cylindrical flange and an outwardly-opening cavity encircled by said flange, manual gripping means on the outer circumference of said flange, and a pressure gauge carried by the ram and at least partially received in said outwardly-opening cavity in nesting relationship, and the inner end portion of the ram having a passage communicating between said pressure gauge and the reservoir.

2. In the resin extruder defined in claim 1, the dispensing nozzle being located centrally of one end of the reservoir, a spring-closed valve for controlling flow of resin from the reservoir through the dispensing nozzle and having an elongated valve body projecting lengthwise into the reservoir from the dispensing nozzle, and an axial bore in the inner end portion of the ram opening toward the dispensing nozzle and having a sufficiently large cross section to receive telescopically therein at least a portion of the length of said elongated valve body when the ram is screwed into the reservoir, thereby shortening the combined length of said elongated valve body and the ram.

* * * * *